Patented Nov. 14, 1944

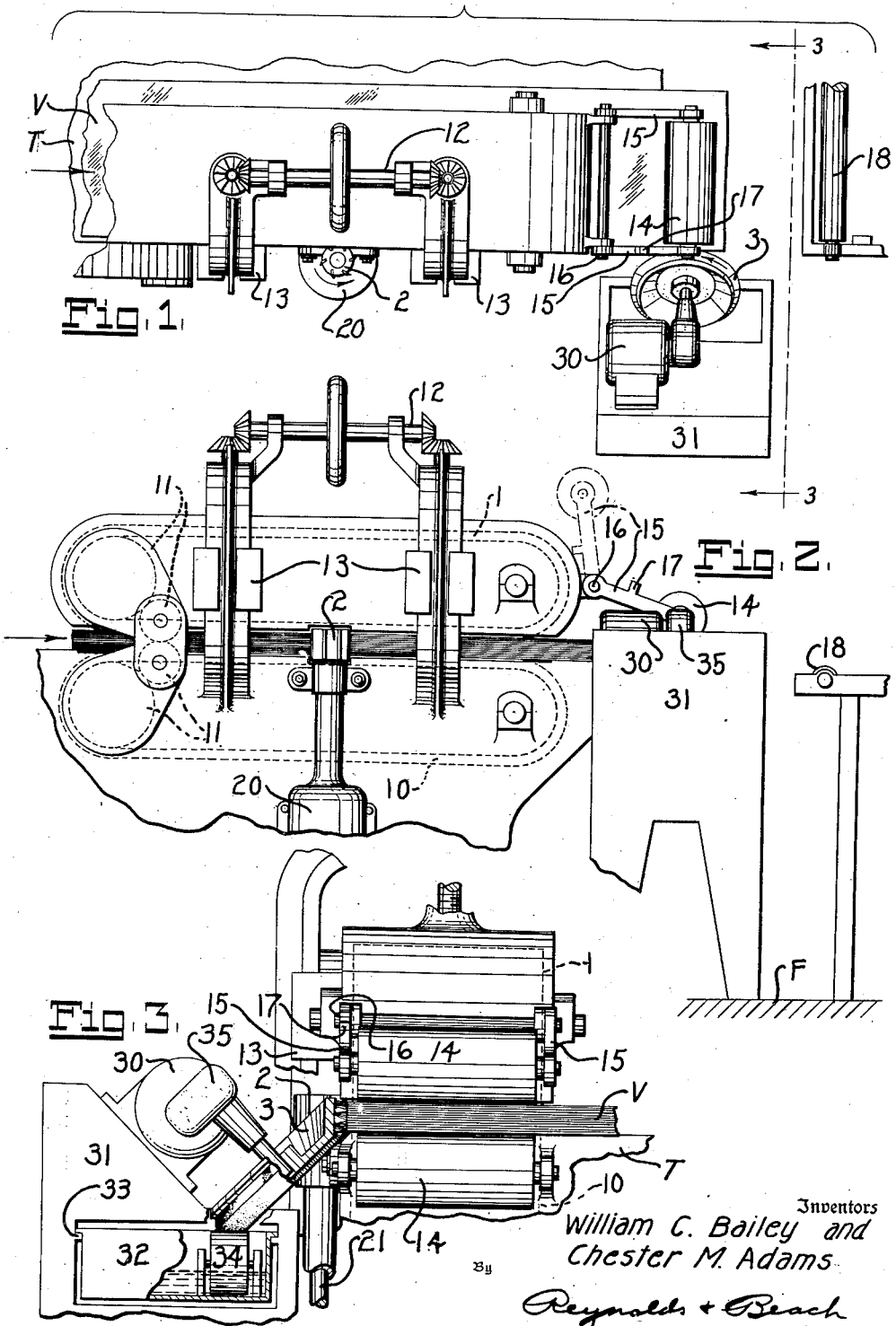

2,362,527

UNITED STATES PATENT OFFICE 2,362,527

VENEER EDGE PREPARING APPARATUS

William C. Bailey and Chester M. Adams, Seattle, Wash., assignors to United States Plywood Corporation, Seattle, Wash., a corporation of New York Application January 7, 1941, Serial No. 373,424

1 Claim. (Cl. 144—1)

Our invention relates to a combined jointing and glue applying machine, particularly useful for preparing sheets of veneer to be connected by butt joints by the use of a machine such as disclosed in the companion application of William C. Bailey, Serial No. 354,817, filed August 30, 1940, for a Veneer edge-gluing machine.

It has heretofore been impractical to make glued butt joints of veneer sheets for reasons discussed more fully in the above mentioned application of William C. Bailey. In order to make such a joint adhere properly throughout its length, in addition to having the abutting edges pressed firmly together it is necessary that the proper amount of adhesive be distributed uniformly along the joint. The type of adhesive best suited for this purpose is of the resinous type, which is set by the application of heat. Prior to the joining operation, therefore, it is preferable to let the adhesive dry after it is applied to the joining edges. If insufficient adhesive is present in certain locations along the joint these portions will not be held securely, and will tend to open up. If, on the other hand, an excessive amount of adhesive is applied to some parts of a jointed edge, a hard projecting bead of adhesive may be formed which will space such edge parts from the other joining edge farther than the other parts, thus preventing a straight and firm joint being obtained.

Where an edge joining operation has been used heretofore it has been customary to apply the adhesive with a brush to the edge of each sheet. By such an operation it is impossible to distribute the adhesive uniformly and apply it only on the edge if the sheet is thin. Instead such adhesive will also be smeared to a considerable extent over the sheet faces. Not only does such application waste the adhesive material, which is relatively expensive, but when the joint is pressed during the joining operation between heated press plates the adhesive on the faces of the joining edges will stick to the platens, often making it difficult to remove the jointed panels from the press without danger of rupturing the freshly made joints. Even though the adhesive could be kept from the faces of the sheets for the most part at the time the adhesive is applied, if too much is placed on the edges the excess adhesive will flow out from between the joining edges when they are pressed together over the face portions adjacent the joint, which again tends to cause the sheets to adhere to the press platens so that it is difficult to remove them from the press without injuring the joint.

It is evident, therefore, that the application of adhesive to the edges of thin veneer sheets to be joined by butt joints has heretofore presented a difficult problem, solved by our process and mechanism. For this purpose we combine the edge jointing and glue applying steps in the same process in preparing the edges of a number of veneer sheets, 8 to 15, for example, simultaneously, which may be accomplished by the use of elements operating consecutively upon the stacked sheets. Briefly, the desired number of veneer panels are laid, in horizontal planes, one upon another with their joining edges generally in alignment. Such edges cannot be precisely aligned by such piling operation because the sheets, which are quite thin, are more or less warped, particularly along such edges, as described in the above mentioned application of William C. Bailey. The number of sheets processed at once will depend, of course, to a large extent upon their individual thicknesses.

When the veneer sheets are thus stacked they are acted upon by pressing mechanism which will flatten out all the warpage in them for a considerable distance, of predetermined extent, back from their edges, so that such generally aligned edges will present a compact laminated edge wall of irregular contour upon which to operate. While thus compressed, with the pressed face portions of adjacent panels held in contiguous engagement, the laminated wall is first trimmed by a cutter head which will joint all the veneer edges simultaneously in a predetermined plane, so that each one will be straight, and without any, or any material, relaxation of pressure, and while thus held compressed in contiguous relationship, the jointed edges only will all then simultaneously be coated with adhesive by a suitable applying element.

The jointing element used may be a cutter head of conventional type, which either may move along the sheet edges while held stationary or the sheets, while held pressed together, may be moved past the cutter head. The adhesive applying element is preferably a brush having a face of a width substantially equal to the composite thickness of the stacked veneer sheets. The brush may be traversed jointly with the cutter head along the sheet edges, if the latter are fixed in position, to apply adhesive to them, or the compressed pile of veneer sheets may be moved first past the cutter head and then immediately past the adhesive applying element, which latter type of machine has been illustrated in the drawing. Moreover, the brush is preferably rotated, both to afford a brushing action along the panel edges and to enable the adhesive on it to be replenished regularly and uniformly, as, for example, by contact with the periphery of a roller which passes through a reservoir of the liquid adhesive material.

By performing the jointing and adhesive applying operations upon a member of stacked veneer sheets as successive steps of a single process it is thus insured that the adhesive will be spread uniformly along only the edges of such sheets, thus avoiding the application of any adhesive to their faces. It will be evident that the essential characteristic of our process is that the adhesive application step is carried out while the panels are held in the contiguous face contact and edge aligned relationship which they occupied immediately following the jointing step, and without any intervening relaxation of pressure which might permit even minute displacement of one sheet, or jointed edge, relative to another. If the force compressing the panels into this relationship were released prior to the adhesive applying step it would be imposssible as a practical matter to again stack and compress the panels so that their edges would be aligned in exact registry because of their tendency to warp, unless a subsequent jointing cut were taken along the panel edges in their restacked position, which would involve the use of our process. Exact alignment of the sheet edges when thus restacked would be impossible in their unflattened condition, and the sheets cannot be shifted into edge aligned position after application of sufficient pressure to press out their warpage.

By the use of our mechanism not only is the adhesive applied to the panel edges when they are held in exact registry, but the adhesive is distributed uniformly upon such edges, the amount applied by the brush being substantially the same at all times, and any excess being brushed off the edges during the applying step.

The drawing illustrates mechanism which is suitable for carrying out our process, and which has certain advantages as will be described hereafter, but it will be understood that various types of mechanism other than that shown may be devised to perform our method. Likewise some changes may be required in the disclosed mechanism for different types of operating conditions.

Figure 1 is a plan view of our machine, and Figure 2 is a side elevation view of it.

Figure 3 is an end elevation view of a portion of our machine to an enlarged scale, taken along line 3—3 of Figure 1, with parts broken away.

We have illustrated our process as being carried out by a machine through which the veneer sheets, in stacked position, move while being maintained compressed into contiguous face-to-face relationship, as mentioned above. The sheets of veneer V, after being stacked, are fed into the machine from the left of Figures 1 and 2, as indicated by the arrows, one edge of the stack of sheets moving between upper and lower compression belts 1 and 10, respectively, which may comprise interconnected jointed sections, as in an endless tread, and the remainder of the stack being supported on the horizontal table T alongside belt 10 as shown in Figures 1 and 3. Appropriate mechanism may be provided to produce sufficient and uniform pressure by these belts along the edge of the stack of veneer sheets throughout its travel. This may require nothing more than the weight of the upper belt sections alone, the lower belt being held from yielding under such weight, or may include additional weights or compression spring mechanism acting upon the presser belts. Such mechanism, being of suitable conventional construction, is not shown.

The belts 1 and 10 may be driven to move the stack of veneer sheets in the direction indicated by suitable drive gears 11. Turning of the handwheel on shaft 12 will raise or lower the upper belt 1 relative to lower belt 10, so that their spacing will conform to the height of the stack of veneer sheets to be processed. Belt 1 and its operating mechanism is guided for such vertical movement by guide flanges 13 sliding on the brackets which support shaft 12.

Alongside the path of movement of the stack of veneer sheets is a jointing cutter head 2, of a length in excess of the height of the wall formed by the stacked veneer sheets, which cutter head is driven by a motor 20 acting through an upright shaft 21. The cutter head rotates, as shown in Figure 1, in a direction so that the cutter blades move in opposition to the direction of travel of the veneer sheets. As the veneer stack is fed to the right in Figure 2, therefore, all the edges on the right hand side of the cutter head will have been cut straight and will be in exact vertical registry, as shown in Figure 3.

The adhesive applying brush may contact the edges of the sheets prior to movement of the leading edge of the stack beyond the zone of travel of belts 1 and 10 at the right of Figure 2. It is only necessary, however, that some adequate mechanism be employed to maintain the veneer sheets in the same contiguous face-to-face and edge aligned relationship as when jointed until after the adhesive has been applied. We have found the mechanism illustrated to be suitable for this purpose, which includes a fixed lower roll supported on the end of the veneer stack supporting table, the upper portion of whose periphery is coplanar with such table and the upper run of belt 10, and a cooperating weighted roll which is vertically movable, such rolls being designated 14. This latter roll may be supported by an arm 15 which is pivoted at 16 to swing from the full-line operative position of Figures 1, 2, and 3 into the retracted position shown in broken lines in Figure 2. A stop 17 may be provided to engage the frame of the machine when this roll is moved to retracted position, to limit its swinging movement.

The rolls 14, it will be noted, are precisely in line with the glue applying brush 3, so that when the adhesive is applied the panel stack is held compressed with the edges of the veneer sheets in the same relationship as immediately following the jointing operation. Retraction of the upper presser roll 14 is permitted so that the machine may be used merely to joint panels which are not to be edge glued, in which case the brush 3 would be removed or shifted to a retracted position. While upper roll 14 is described as a weighted roll, for the purpose of affording sufficient pressure to iron out the stack of veneer sheets suitable spring pressing mechanism might be utilized with a light weight roll, and such springs might, for example, act upon arms 15 to press them downward.

The details of the adhesive applying mechanism are best shown in Figures 1 and 3. The brush 3 has a beveled periphery, the bevel angle with respect to the axis of rotation preferably being about 45°. As previously stated, the width of bristles carried by the brush periphery should be substantially equal to the height of the stack of veneer sheets. Even if the brush width is greater than this, however, it will not coat the upper and lower faces of the stack for the broad stack edge will afford resistance to inward movement of the brush sufficient to prevent such action. This head 3 is supported and driven by a motor 30 mounted upon a pedestal 31, which may be integral with the jointing cutter supporting frame, or, as shown, may be supported independently from the floor F and be movable for retraction of the brush 3 from the path of the veneer sheets moving through the machine when it is not desired to apply adhesive.

The pedestal 31 houses a tank 32 containing adhesive, and which may be supported on ways 33, so that it can be withdrawn from the pedestal for cleaning and refilling by sliding it through a side opening, as shown in Figure 3. A brush contact and adhesive pick-up roll 34 is supported for rotation on a generally horizontal axis within the pan 32, so that its periphery is partially immersed in the adhesive. When in operative position the periphery of brush 3 not only contacts the vertical jointed edges of the veneer sheet stack, but also the periphery of roll 34, such double contact being permitted by the 45° inclination of the brush periphery.

As previously stated, the direction of brush rotation, as shown in Figure 1, is such that the veneer contacting portion of its periphery moves in the direction opposite to that in which the veneer sheets are fed by the belts 1 and 10. Further, since the adhesive applying brush is located on the discharge side of the jointing cutter 2, a perfectly planar laminated surface is provided for contact by the brush, such surface being uninterrupted by voids by reason of the maintenance of pressure upon the stack of veneer sheets, after leaving belts 1 and 10, by rolls 14 located in alignment with brush 3. The speed of rotation of the brush will be relatively slow, as will be the movement of the stack of sheets, and such speed of brush rotation may be established at the value desired by suitable reduction gear mechanism 35.

The portion of brush 3 moving into contact with the jointed veneer sheet edges is uniformly covered with adhesive which is wiped upon such jointed edges. Any excess adhesive is brushd off and absorbed by the brush. As its rotation continues its periphery moves into contact with the periphery of roll 34. The frictional interengagement of the roll and brush peripheries is sufficient to effect rotation of such roll by the brush through the adhesive liquid reservoir in the direction opposite to the brush rotation. The portion of the periphery of brush 3 from which adhesive has been transferred to the edges of the veneer sheets will then contact with the portion of the periphery of roll 34, emerging from the adhesive bath coated with adhesive. The supply of adhesive on brush 3 will thus be replenished by absorption of the thin, uniform film from the periphery of roll 34, and the recharged brush portion will move again into contact with the edge of the veneer panel stack.

As this stack moves on beyond rolls 14 onto any suitable conveyor 18 the pressure will be released, and the edges of the several sheets will again assume their warped contour. By this time, however, they have been jointed and have received, on their edges only, a uniform layer of adhesive. In making a butt joint, therefore, it is only necessary, as pointed out in the application of William C. Bailey mentioned above, to flatten out the portions of the panels being joined alongside the joint to a width not less than the width of belts 1 and 10 and the length of rollers 14. This flattening operation will again press the jointed, adhesive bearing edge of each panel into linear condition, and the abutting edges may be pressed together with uniform pressure and continuous contact throughout their lengths, in order to make the joints.

Because in the joining operation the conditions of the jointing operation are duplicated for each panel edge, and because the adhesive has been applied to the jointed edge of each veneer sheet in a uniformly distributed manner, no adhesive having been applied to the faces, a joint of equal strength in all portions throughout its length will be produced between the joining edges, and the sheets will have little or no tendency to adhere to the platens.

What we claim as our invention is:

Mechanism for preparing the edges of veneer sheets for joining, comprising upper and lower endless tread belts spaced apart to receive therebetween a stack of horizontally disposed veneer sheets and arranged to compress such stack vertically to dispose all adjacent sheets in contiguous face-to-face contact, a jointing cutter head disposed alongside said endless tread belts in position to joint simultaneously to the edges of all such stacked veneer sheets moving between said endless tread belts, means for driving said belts to move such veneer sheets past said cutter head, upper and lower pressure rolls located immediately beyond the discharge end of said endless tread belts, and adapted to maintain the stacked veneer sheets in the same edge-aligned and contiguous face-to-face contact occupied immediately after being jointed by said cutter head, and adhesive-applying means alongside said rolls for coating simultaneously the jointed edges only of the veneer sheets while thus contiguously compressed in such stack.

WILLIAM C. BAILEY.
CHESTER M. ADAMS.